US009494785B2

(12) United States Patent
Wereley et al.

(10) Patent No.: US 9,494,785 B2
(45) Date of Patent: Nov. 15, 2016

(54) SINGLE IMAGE SUPER-RESOLUTION MICROSCOPY AND TELESCOPE SYSTEMS

(71) Applicant: PURDUE RESEARCH FOUNDATION, West Lafayette, IN (US)

(72) Inventors: Steven T. Wereley, West Lafayette, IN (US); Craig A. Snoeyink, Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 206 days.

(21) Appl. No.: 14/101,107

(22) Filed: Dec. 9, 2013

(65) Prior Publication Data

US 2014/0160266 A1    Jun. 12, 2014

Related U.S. Application Data

(60) Provisional application No. 61/734,423, filed on Dec. 7, 2012.

(51) Int. Cl.
| | |
|---|---|
| *H04N 9/47* | (2006.01) |
| *H04N 7/18* | (2006.01) |
| *G02B 21/36* | (2006.01) |
| *G02B 27/58* | (2006.01) |
| *H04N 5/225* | (2006.01) |
| *H04N 5/228* | (2006.01) |

(52) U.S. Cl.
CPC ......... *G02B 21/365* (2013.01); *G02B 21/361* (2013.01); *G02B 27/58* (2013.01)

(58) Field of Classification Search
CPC .......... H04N 9/47; H04N 7/18; H04N 5/225; H04N 5/228
USPC ............................. 348/222.1, 79, 61, 207.99
See application file for complete search history.

(56) References Cited

U.S. PATENT DOCUMENTS

| | | | | |
|---|---|---|---|---|
| 2001/0045529 | A1* | 11/2001 | Iketaki et al. | 250/493.1 |
| 2007/0063043 | A1* | 3/2007 | Heinrich | 235/454 |
| 2011/0304723 | A1* | 12/2011 | Betzig | 348/79 |

OTHER PUBLICATIONS

Baldwin et al., "The application of interferometry to optical astronomical imaging," *Philosophical Transactions: Mathematical, Physical and Engineering Sciences*, 360(1794):969-986 (2002).
Beckers, "Adaptive Optics for Astronomy: Principles, Performance, and Applications," *Annual Review of Astronomy and Astrophysics*, 31:13-62 (1993).
Bin et al., "Diffraction property of an axicon in oblique illumination," *Appl. Opt.*, 37(13):2563-2568 (1998).
Boruah, "Lateral resolution enhancement in confocal microscopy by vectorial aperture engineering," *Appl. Opt.*, 49(4):701-707 (2010).

(Continued)

*Primary Examiner* — Daquan Zhao
(74) *Attorney, Agent, or Firm* — Marshall, Gerstein & Borun LLP

(57) ABSTRACT

Image resolution enhancement techniques are implemented using a single image an unstructured broadband illumination. By placing an axicon and a convex lens pair in an optical path of a microscope, telescope, or the object system, between the system and an image capture pickup device (e.g., a camera) the maximum resolution of the system may be increased through the formation of an interference pattern at the image capture device.

24 Claims, 9 Drawing Sheets

(56) References Cited

OTHER PUBLICATIONS

Cagigal et al., "Design of Continuous Superresolving Masks for Ground-based Telescopes," *Publications of the Astronomical Society of the Pacific*, 116:965-970 (2004).

Guyon et al., "Simultaneous Exoplanet Characterization and deep wide-field imaging with a diffractive pupil telescope," *The Astrophysical Journal*, 767(1):1-14 (2013).

Hagsater et al., "A Compact Viewing Configuration for Stereoscopic Micro-PIV Utilizing MM-Sized Mirrors," *Exp. Fluids*, 45:1015-1021 (2008).

Kumar et al., "3D3C velocimetry measurements of an electrothermal microvortex using wavefront deformation PTV and A single camera," 15th Int. Symp. on Applications of Lasers Techniques to Fluid Mechanics (2010).

Law et al., "Lucky Imaging: High Angular Resolution Imaging in the Visible from the Ground," *Astronomy & Astrophysics*, 446:739-745 (2006).

Pereira et al., "Microscale 3D Flow Mapping with μDDPIV," *Exp. Fluids*, 42(4):589-599 (2007).

Satake et al., "Three-Dimensional Flow Tracking in a Micro Channel with High Time Resolution Using Micro Digital-Holographic Particle-Tracking Velocimetry," *Opt. Review*, 12(6):442-444 (2005).

Seager et al., "Photometric Light Curves and Polarization of Close-in Extrasolar Giant Planets," *The Astrophysical Journal*, 540(1):504-520 (2000).

Snoeyink et al., "A Novel 3D3C Particle Tracking Method Suitable for Microfluidic Flow Measurements," *Experiments in Fluids*, 54:1453-1457 (2013).

Snoeyink et al., "Single-image far-field subdiffraction limit imaging with axicon," *Opt. Lett.*, 38(5):625-627 (2013).

Snoeyink et al., "Three Dimensional Locating of Paraxial Point Source with Axicon," *Opt. Lett.*, 37(11):2058-2060 (2012).

Snoeyink, "Imaging performance of Bessel beam microscopy," *Opt. Lett.*, 38(14):2550-2553 (2013).

Trilling et al., "Near-infrared coronagraphic imaging of the circumstellar disk around TW Hydrae," *The Astrophysical Journal*, 552(2):L151-L154 (2001).

Wild, "A New Method of Image Formation with Annular Apertures and an Application in Radio Astronomy," *Proceedings of the Royal Society A: Mathematical, Physical and Engineering Sciences*, 286(1407):499-509 (1965).

Wu et al., "Three-Dimensional Fluorescent Particle Tracking at Micron-Scale Using a Single Camera," *Exp. Fluids*, 38:461-465 (2005).

\* cited by examiner

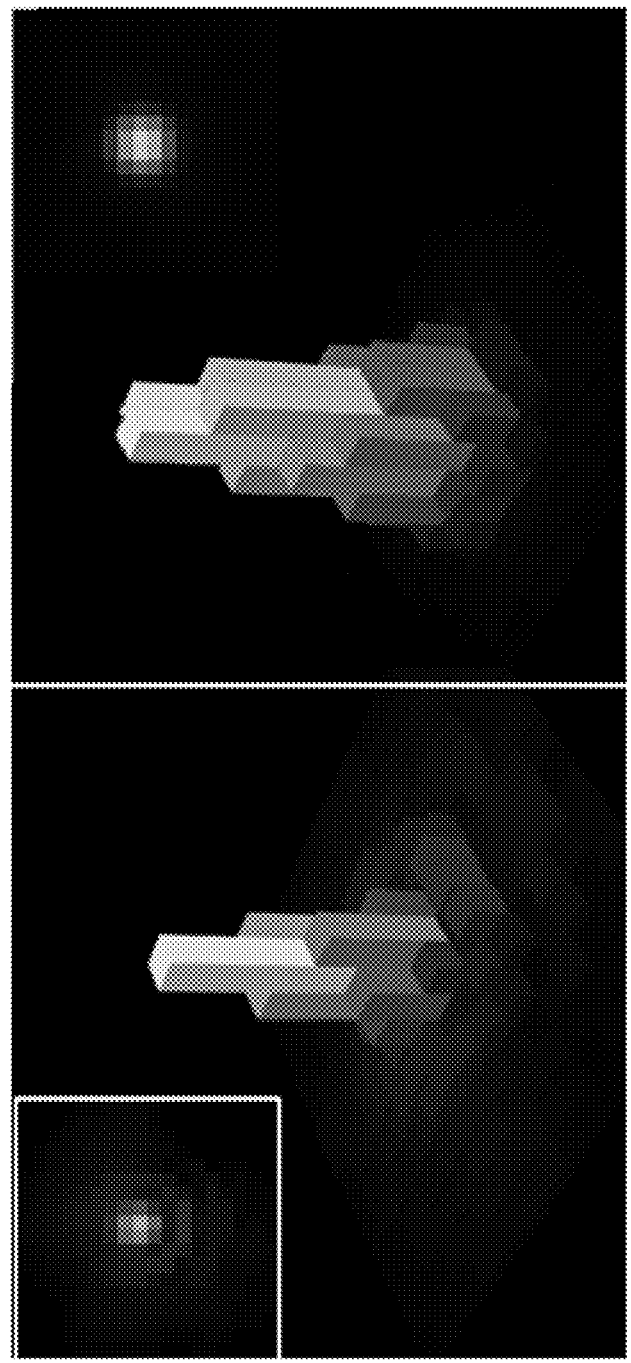

SINGLE IMAGE SUPER-RESOLUTION MICROSCOPY AND TELESCOPE SYSTEMS

CROSS-REFERENCE TO RELATED APPLICATIONS

This application claims the benefit of U.S. Application Ser. No. 61/734,423, filed Dec. 7, 2012, and entitled, "Single Image Super-Resolution Microscopy with Interference Microscopy," the entirety of which is hereby incorporated by reference.

TECHNICAL FIELD

The present disclosure generally relates to microscopy and telescopic systems, and in particular to enhanced resolution imaging in such systems.

BACKGROUND

Optical measurement methods for nanometer scale features have progressed rapidly in recent years with the introduction of several super-resolution techniques capable of surpassing the diffraction barrier. For example, Structured Illumination Microscopy can halve the resolution of a microscope by reconstructing a higher resolution image from several lower resolution images taken while varying an illumination pattern. In other examples, localization techniques have been used to emit only a portion of the fluorophores from a sample at any time. A resulting intensity profile then can be fit to localize the fluorophore with high resolution to produce near nanometer resolution in certain cases.

Common to all these techniques, however, is a need to acquire several images along with specialized illumination, fluorescent tags, or both, in order to reconstruct the higher resolution information.

There is also a need to acquire higher resolution information from telescopic systems. For example, in astronomical observations, particularly astrophysical measurements of binary stars, exo-planets, or accretion disks, the angular resolution of the measurement is particularly important. Working against these measurements are two factors: the seeing limit and the diffraction limit. The seeing limit arises from turbulent mixing of the Earth's atmosphere causing variations in index of refraction. These variations cause the image of a point to break up into a several blobs or speckles that move around rapidly. In addition to moving the telescope to space, techniques such as lucky imaging and adaptive optics have become highly effective at minimizing this limit to resolution. In contrast, the diffraction limit of telescopes is a function of the instrument itself, scaling linearly with the diameter of the telescope's aperture. Therefore, there is a need to improve the diffraction limited resolution of widefield telescopes.

BRIEF DESCRIPTION OF DRAWINGS

FIGS. 9(a) and 9(b) illustrate results of imaging a point spread function with the telescope system of FIG. 7, with FIG. 9(a) showing imaging with an axicon enhancement system and with FIG. 9(b) showing imaging of the base telescope without an axicon enhancement system, in accordance with an example.

DETAILED DESCRIPTION

Figure 1:
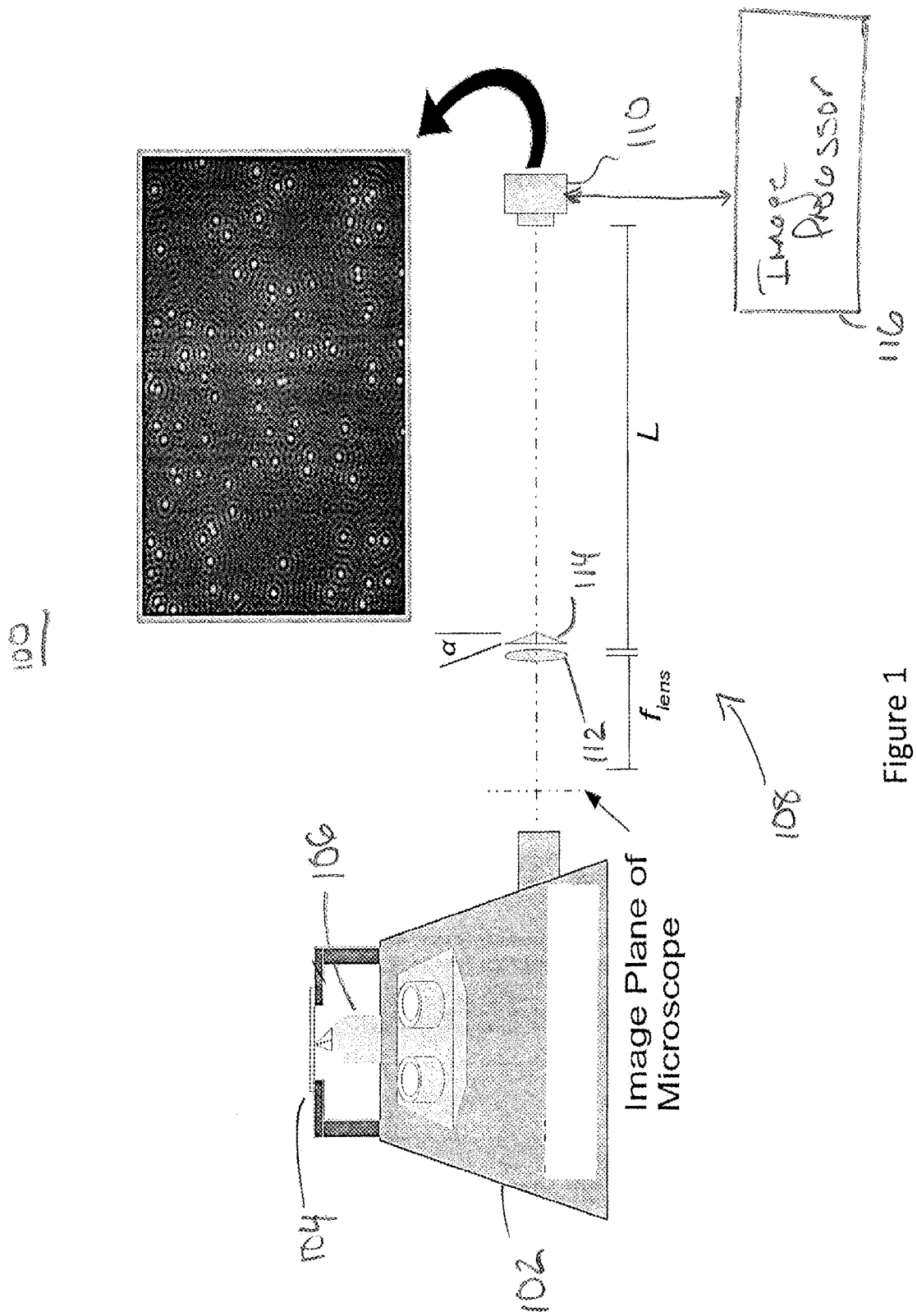
FIG. 1 is a schematic of an interference microscopy system showing the relative positions of a lens objective system, axicon, and camera, in accordance with an example.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present techniques describe single image enhanced resolution microscopy and telescopic arrangements. In the examples of microscopy, the arrangements are based on Bessel Beam microscopy and are capable of acquiring localization data in a single image using unstructured broadband illumination. More specifically, by placing an axicon and a convex lens in the optical path of a microscope between the microscope and the camera, the maximum resolution of this system, which is termed herein Bessel Beam Microscopy (BBM), may be expressed as $d_{IM}=0.38/\lambda/NA$ which scales similarly to the resolution of the base microscope $d_{Rayleigh}=0.61/\lambda/NA$ but was 38% smaller. Experimentally, this unexpected increase in resolution was demonstrated by resolving individual fluorescent polystyrene beads that are smaller than the diffraction limit resolution of the microscope. Ultimate diffraction limited resolution of the microscope was developed using angular spectrum diffraction simulations.

Generally speaking, super-resolution microscopy techniques described herein provide researchers in biology, chemistry, and engineering the ability to perform optical measurements at length scales approaching the scale of molecules. With conventional techniques, in order to resolve details below the diffraction limit of a microscope, the techniques would need to combine information from tens to thousands of images to reconstruct a higher resolution image. These conventional techniques would require complicated and expensive illumination schemes and specialized fluorescent dyes.

In contrast, the Bessel beam microscopy (BBM) techniques described herein employ a new approach of improving resolution (i.e., increasing the resolution of an optical system) by manipulating the light as it leaves the microscope. An example Bessel beam microscopy optical system 100 is shown in FIG. 1. As shown in the example of FIG. 1, the Bessel beam microscopy system 100 includes a microscope 102 having a sample stage 104 and an imaging objective 106. The image data collected by the microscope 102 is coupled to a resolution enhancement stage 108, which may include two (or more) optical elements placed between the microscope 102 and an imaging station, such as the camera 110. In the illustrated example the enhancement stage 108 includes a lens objective 112, which in the illustrated example is depicted as a single convex lens. The lens 112 is placed such that its focal plane is coincident with the image plane of the microscope 102, as shown. Following the convex lens 112 is an axicon 114, which is an optical element with a conical surface, as opposed to a spherical surface. As shown, in some examples, the axicon 114 immediately follows the convex lens 112. It will be appreciated that while an axicon is shown, the element 114 may be an axicon stage, comprising additional optical elements configured to pair with any additional optical elements in the in the lens objective. In any event, the combination of the convex lens 112 and the axicon 114 is able to transform a point spread function (PSF) of the microscope into a Bessel beam pattern, which has the ability to propagate without diffracting.

The transformation of the PSF from an Airy disk to a Bessel function has several useful implications, as discovered. A traditional microscope's PSF is that of Airy Disk for which the central peak width is proportional to the wavelength of light and inversely proportional to the aperture radius of the system. In contrast, the PSF of the example BBM system 100 shown in FIG. 1 is a Bessel beam for which the intensity is proportional to:

$$I \propto J_0^2(S) \quad \text{Equation 1}$$

where $J_0$ is a zero order Bessel function of the first kind, $$S = \frac{2\pi r \backslash \alpha(n-1)}{\lambda D},$$

$\lambda$ is the wavelength of light, r is the radius from the center of the beam, $\alpha$ is the surface angle of the axicon, and n is the axicon's index of refraction, and D is a component of the system matrix for the optical system in between the axicon 114 and the camera 110. The addition of optical elements for the resolution enhancement stage 108 allows a researcher to have a single axicon and continuously adjust the PSF width. The first zero of $J_0$ is found at s=2.401 so the first minimum of the intensity, $r_0$ occurs at:

$$r_0 = 2.401 \frac{\lambda D}{2\pi\alpha(n-1)} \quad \text{Equation 2}$$

Notably, $r_0$ is a function of the wavelength and properties of the axicon. The width of the PSF is thus decoupled from the numerical aperture (NA) of the system and can be varied at will by changing the surface angle of the axicon or by adding optical elements into the space between the camera 110 and axicon 112. For example, it is common to add a single convex lens between the camera 110 and axicon 112 of varying focal length and distance based on the particular application. Other paraxial optical elements may be added instead.

The second aspect of the PSF uses the Bessel beam's non-diffracting properties. Since a Bessel beam can maintain the sharpness of its central peak while traveling for extended distances, there is no focal plane in which to place the camera 110. Instead the experimenter may move the camera relative to the object, to adjust the magnification and field of view, but the focus is maintained. The only variable need be the distance over which the Bessel beam maintains its integrity. The flexibility of the placement of the camera, detangling it from the focal plane of the microscope allows for more freedom in designing imaging systems, whether microscopy systems, telescopic systems, or otherwise. The ability to resolve images below a wavelength limit using an optical system that is not limited by object positioning has numerous applications and advantages.

The Bessel beam produced by an axicon is an interference-based beam; and the pattern created is that of a planar or near planer light beam that has been bent inward to interfere with itself. Once the light rays cease to overlap and interfere, the pattern breaks down. A ray transfer matrix may be defined having four elements traditionally labeled A, B, C, and D, describing how a ray's direction and location are transformed by a given optical system. The value C is the effective distance from the axicon to the camera. If there are no optics placed between the axicon and camera, the effective distance, C, becomes equal to the physical axicon-camera distance. The largest value of C value in the system matrix for the optical elements in between the axicon and camera for which the light rays overlap was given by:

$$C_{max} = \frac{r_a D}{\alpha(n-1)} \quad \text{Equation 3}$$

where $r_\alpha$ is the radius of the beam at the axicon, n is the index of refraction the axicon, $\alpha$ is the surface angle of the axicon and C and D are components of the system matrix of the optical elements between the axicon and the camera. The value of C can be achieved any number of ways and it is left to the researcher to optimize the values of C and D in the optical system matrix to meet their needs. However, if no optical elements are used, then C=L, the distance between the axicon and camera, and D=1. If the convex lens is chosen with a focal length equal to the tube lens of the microscope, assuming it is infinity corrected, then $r_\alpha$ is equal to the radius of the aperture of the microscope objective.

With this information, we determined the maximum resolution of the IM system. When the convex lens in the IM system is chosen to have a focal length equal to that of the microscope's tube lens, then any distance on the camera sensor may be related to a distance in the measurement plane, by the relationship:

$$\frac{d_m}{f} = \frac{d_c}{C} \quad \text{Equation 4}$$

where $d_m$ is the distance in the measurement plane, $d_c$ was the distance in the plane of the camera, and f was the focal length of the objective. Using the Rayleigh criterion where the minimum resolvable distance corresponds to when the maximum for one PSF resides in the first minimum of another gives that $d_c=r_0$. Substituting Equations 2 and 3 into Equation 4 gives:

$$\frac{d_m}{f} = \frac{2.401 \frac{\lambda D}{2\pi a(n-1)}}{\frac{r_a D}{a(n-1)}}$$ Equation 5

Simplifying Equation 5, applying the definition of numerical aperture where NA=$n_m$ sin(θ) where θ is the half angle of light accepted by the microscope objective and $n_m$ is the index of refraction of the objective immersion medium, small angle approximation, utilizing the following trigonometric identity:

$$\tan(\theta) = \left(\frac{1}{\sin^2(\theta)} - 1\right)^{-1/2}$$ Equation 6 and solving for $d_m$ gives the following relationship for the minimum resolvable distance in the measurement plane:

$$d_m = 0.39\lambda \left(\frac{n_m^2}{NA^2}\right)^{1/2}$$ Equation 7

This expression has a coefficient that was three times smaller than previous work: 0.39 as compared to 1.22. In the limit of a small NA, Equation 7 was equivalent to $d_m$=0.39λ/2 NA which was approximately three times smaller than 1.22λ/2 NA, the well-known Rayleigh resolution limit for a microscope. Thus, the interference microscopy system, in the example of FIG. 1 resulted in a 38% improvement in resolution over the base microscope.

The resolution may be increased further by adding the axicon enhancement techniques with other resolution enhancement techniques, such as Structure Illumination Microscopy (SIM), to effectively "stack" the resolution gains of the two systems.

This 38% improvement in resolution (i.e., also described as increased resolution or higher resolution), in these examples, was comparable with other far field super-resolution techniques and was notable for the fact that it was achieved by manipulating the light after it has passed through the microscope. Other attempts at increasing lateral resolution by conditioning the image light have focused on scanning confocal microscopy and have achieved theoretical resolution gain of 78%. The Bessel beam microscopy example herein, by contrast, acquired super-resolution data over the entire image simultaneously and with static geometric optics.

The increase in spatial resolution may, in some examples, result in a reduction in light incident on an imaging device. And because the more widely spaced the rays used in forming the interference pattern that results from the enhancement stage 108, the greater the resolution of the system so as to achieve the maximum resolution, the rays furthest from the optical axis were used. In other examples, rays approximate to those further from the optical axis may be used. In examples where the loss of incident light could limit the applications of use, the techniques may be supplemented with an increase in the intensity of the light source or other modifications.

Figure 2:
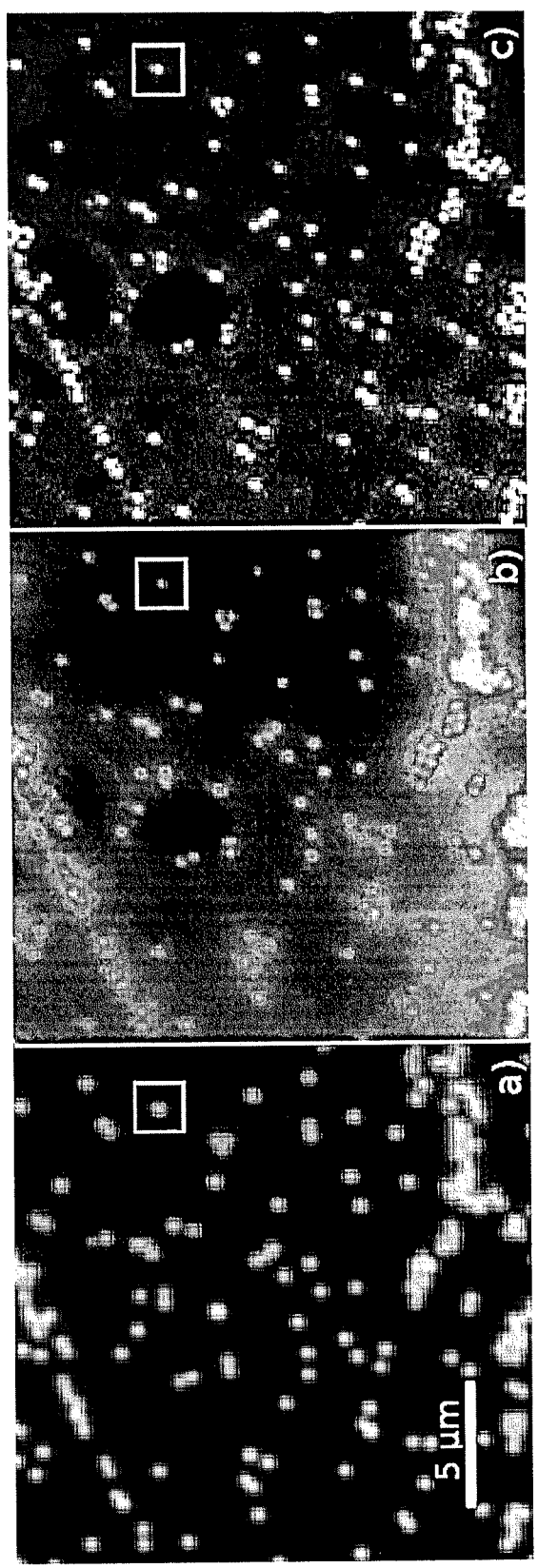
FIGS. 2(a)-2(c) are images of 500 nm fluorescent beads imaged with (a) 40×0.6 NA objective, (b) 40×0.6 NA objective with IM enhancement, and (c) 40×0.6 NA objective with IM enhancement with de-convolution treatment.

Experimentally, the increase in resolution in accordance with an example was demonstrated in FIGS. 2(*a*)-2(*c*). Here 500 nm polystyrene beads fluorescing at 612 nm were imaged with FIG. 2(*a*) a 40× magnification objective with a NA of 0.6, FIG. 2(*b*) the same objective with the IM attachment. This experiment was chosen because adjacent beads were known to be below the diffraction limit of a traditional microscope and thus indistinguishable. Therefore, the ability to resolve individual particles, such as can be seen in FIG. 2(*b*), was an indication that the ultimate resolution of the microscope had been increased by the BBM system. Also note the clarity of the close packed hexagonal arrangement of the polystyrene as this crystal structure was as expected when drying a solution of spherical particles on a smooth surface.

Much of the light that wasn't used to form the central peak of the Bessel PSF still remained in the image. This was evident as the haze that surrounds the particles in FIG. 2(*b*) which lowered the signal-to-noise ratio of the image. There were several approaches to minimizing this noise. The first was to insert a mask immediately behind the axicon which obscures the inner rays of light and which allows those rays approximately the furthest from the optical axis to pass. An alternative was to de-convolve the image with the known Bessel PSF, which may be achieved in an image processor coupled to a camera or other image capture device or sensor. An example of this was shown in FIG. 2(*c*), which shows that the de-convolution significantly mitigated the haze, though at the expense of dynamic range. The de-convolution was performed using commercially available imaging software named ImageJ with the Iterative Parallel De-convolution plugin, made available by Piotr Wendykier.

Figure 3:
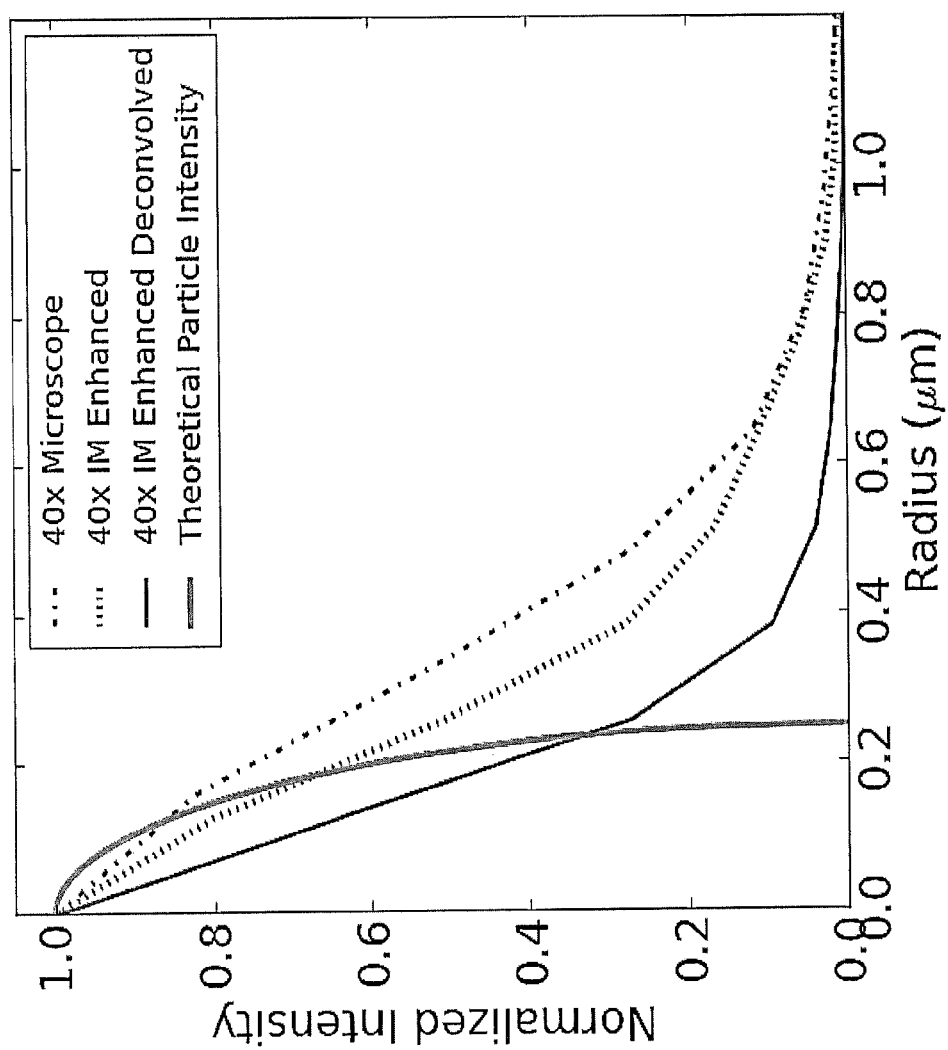
FIG. 3 is a plot of circularly averaged intensity profiles vs. intensity for single particle highlighted by white boxes in FIG. 2.

The intensity profiles of the particle surrounded by the boxes in FIGS. 2(*a*)-(*c*) were circularly averaged, normalized, and plotted in FIG. 3 to demonstrate the degree to which the resolution has been increased. The FWHM for these profiles are 0.69 µm, 0.52 µm, and 0.35 µm for the 40× microscope, BBM enhanced microscope, and BBM enhanced and de-convolved images, respectively. An idealized particle intensity profile is shown alongside the averaged image profiles for comparison. The 40×BBM Enhanced profile closely approximated the width of the particle at FWHM. However, because of the extended PSF, the intensity profile extended far beyond the particle boundary. Applying a de-convolution brought the intensity profile width at the base closer to that of the actual particle.

Figure 4:
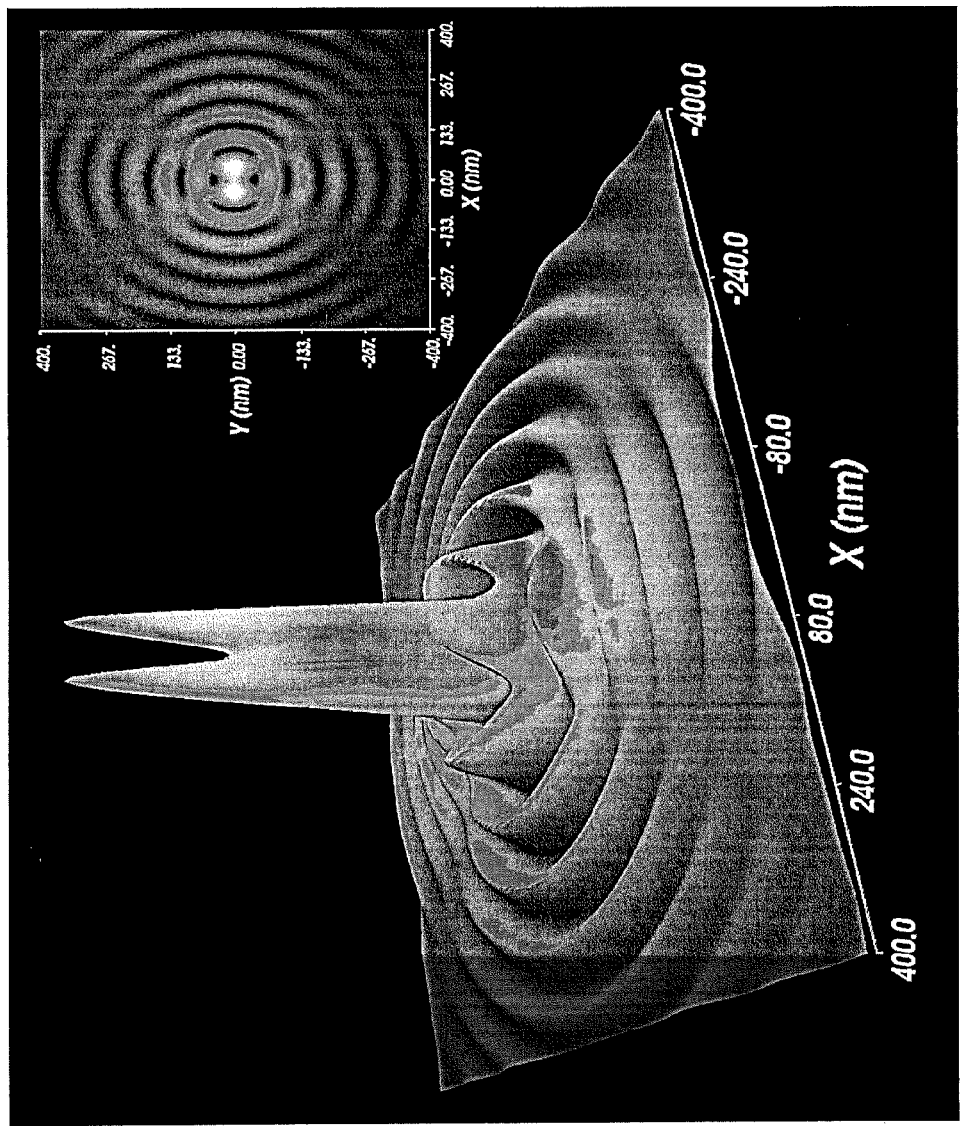
FIG. 4 shows the result of an angular spectrum diffraction simulation of two point sources separated by 70 nm and imaged by an IM enhanced 100×1.4 NA objective microscope, in accordance with an example.

To examine a maximum theoretical resolution of an example BBM system, an Angular Spectrum diffraction simulation was performed using an idealized 100×1.4 NA oil immersion objective. Under these conditions, Equation 7 predicts a theoretical resolution of 68 nm with 400 nm illumination. Two incoherent point sources at this wavelength and separated by 70 nm were simulated in the measurement plane of the objective and a 3D surface plot of the resulting image was shown in FIG. 4. The two peaks for the point sources were visible along with the numerous side fringes that were a result of the Bessel PSF. These simulations well matched the prediction of Equation 7 and the requirements of the Raleigh resolution criteria.

The resolution enhancement techniques herein may be used in numerous applications, including super-resolution microscopy.

Thus, as shown, the techniques described herein may be used for super-resolution microscopy that uses static optic components to increase the diffraction-limited resolution of a microscope threefold. This increase in resolution is obtainable with broadband illumination and common fluorescent dyes. Further, super-resolution data may be acquired in a single image. Moreover, the techniques may afford the experimenter a notable amount of flexibility in terms of magnification and field of view. In particular, the width of the IM enhanced microscope PSF may be adjustable by customizing the surface angle of the axicon or by adding simple optical systems into the optical path between the axicon and camera as per Equation 2. With these modifications, the experimenter is able to optimize the width of the PSF to the pixel size of imaging device (e.g., camera) and feature size of the sample being viewed. In addition, the position of the imaging device (e.g., camera) can be continuously varied to provide the optimize magnification or field of view for the sample being viewed.

The present techniques may also be used to resolve location of an object by analyzing the interference pattern produced by the system 100. In particular, by finding the frequency and center of the resulting Bessel beam-like interference pattern at the imaging device, the position of the originating point source may be determined by reversing the light path and using this following expressions:

$$Z_{point} = \frac{d_{ccd}\beta_{pattern}}{k(n_{axicon} - 1)\alpha - \beta_{pattern}} \quad \text{Equation 8}$$

where $\alpha$ is the angle of the axicon and n is the axicon's index of refraction, $d_{ccd}$ is the distance between the axicon and the imaging plane, and $\beta_{pattern}$ is the frequency of the Bessel function.

$$\frac{x_c}{x_{point}} = \frac{-d_{ccd}}{Z_{point}} \quad \text{Equation 9}$$

$$\frac{y_c}{y_{point}} = \frac{-d_{ccd}}{Z_{point}}$$

where $x_c$ and $y_c$ are the x and y locations of the Bessel function center and $x_{point}$ and $y_{point}$ are the x and y locations of the originating object point.

A camera placed at an imaging location can automatically determine the resulting interference pattern frequency and center peak location, while an image processor (such as an image processor 116 of the system 100) may automatically resolve the location of the original particle image, whether in the imaging plane of a microscope, telescope or other imaging device. Notably, the BBM system is able to better resolve original particle position, in part, because Bessel beam images have stronger, more contrast defined ridges that that of an Airy disk.

To analyze the resulting interference pattern, the image processor (such as image processor 116) may execute stored instructions that perform various image processing steps to the collected image data from the camera or imaging device. The image processor may implement these enhancements to the image data in three steps, for example: (i) a normalized cross-correlation, (ii) correlation peak finding, and (iii) maximization of the cross-correlation peak. For example, a raster window may be applied to the resulting image pattern. Cross-correlations may be performed with the ideal Bessel beam of frequency, $\beta$. The frequency $\beta$ may then be varied to maximize the cross-correlation peak to more narrowly isolation the center peak of the interference pattern. With the cross correlation peak maximization, the frequency of the Bessel function may be determined and the x,y position of the original point resolved. Information may be recorded at each step and used later to determine whether the result corresponds to a particle and is an accurate estimate of a particle's properties.

The normalized cross-correlation may be determined by correlating the resulting interference pattern (or image) against an ideal Bessel beam over a defined window. A peak will form in the cross-correlation where a Bessel beam pattern appears in the interference pattern. The height of this peak is proportional to the degree of correlation between the ideal Bessel beam image and the pattern created by the particle. The size of the window chosen for the normalized cross-correlation can be varied to more clearly define the peaks. The value of the peak may vary based on camera pixel size and the properties of the imaging optics. In some examples, the window may be zero-padded (e.g., to twice its size) before the Fourier transform step to avoid aliasing effects.

The peak may be located by finding the maximum pixel in the cross-correlation and then finding the center of mass of all the pixels in a defined window centered on maximum pixel. Once the center of mass is determined with sub-pixel accuracy, the height of the peak may be identified found using bi-cubic interpolation. The height and location of the peak are recorded as well as a measure of the sharpness of the peak. To determine the sharpness, the smaller of the second order finite differences with respect to either the x-direction or the y-direction of the peak may be used as a metric of the sharpness of a peak, while higher second order finite difference correlates well with the quality of a Bessel beam image.

After the cross-correlation peak is located, the peak may be maximized. This may be achieved in different ways. For example, the normalized cross-correlation and peak determination may be performed repeated for different ideal Bessel beam frequencies until the cross correlation peak, amongst the result set, reaches a maximum. The range of possible Bessel beam frequencies may be discretized and the Fourier transforms of the corresponding ideal Bessel beam images may be pre-computed and stored for easy access. Then, an optimization algorithm may be used to find the maximum peak. An iterative optimization process, such as the golden section search method, may be used to identify the frequency of the Bessel beam corresponding to the maximum. Once the maximum frequency is found, a Gaussian may be fit to the peak to find the height and frequency with sub-interval accuracy. The height and standard deviation of the Gaussian fit are both used to evaluate the quality of the data point.

While the image data from the camera may be processed over a window, such as that shown in FIGS. 2(*a*)-2(*c*), these processes may be performed over multiple windows, including over the enter collected image data, as desired.

In any event, with the image data processed in this way, the frequency $\beta$ and center $(x_c, y_c)$ of the resulting Bessel beam pattern may be translated into the location of the particle image produced by the imaging optics using Equations 8 and 9. Once the location of the particle image is determined, the physical location of the particle may be found by paraxial ray tracing through the imaging optics. It is notable that it is possible to run this algorithm without calibration provided with relatively easy to obtain knowledge of the imaging optic components and distances.

In this way, the techniques described herein may be employed in three-dimensional (3D) tracking systems. These systems may be used to determine the 3D location of a paraxial point source of light and track movement of that point source. As with 2D imaging, the central bright spot of the resulting Bessel beam (interference pattern) is used to determine the in-plane location of a particle, while under paraxial conditions, information on the depth of that particle is shown to be encoded in the spatial frequency of the Bessel beam, thereby allowing for identifying location in a z-axis direction as well.

Figure 5:
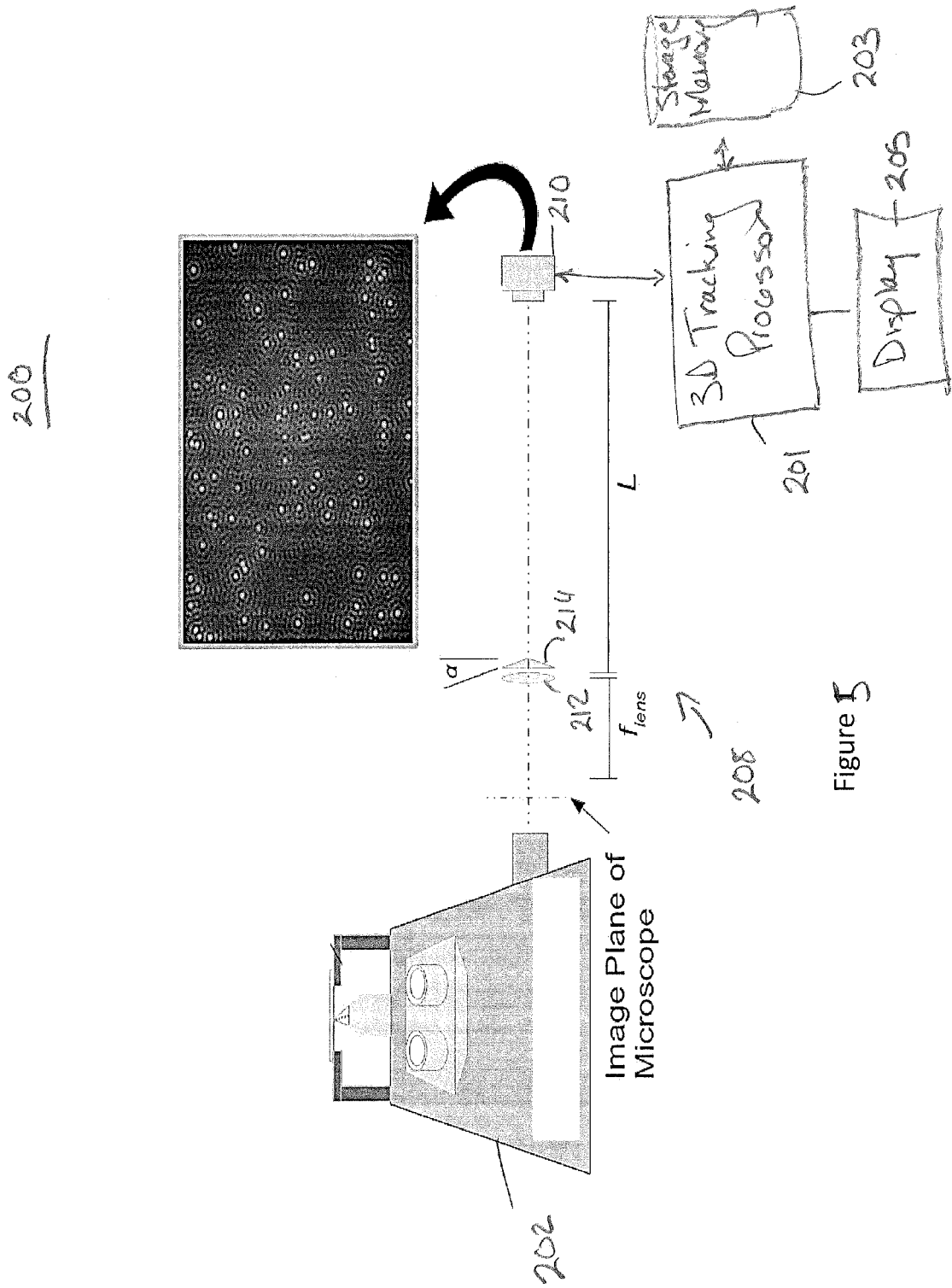
FIG. 5 is a schematic of a microscopy-based 3D tracking system, in accordance with an example.
Figure 6:
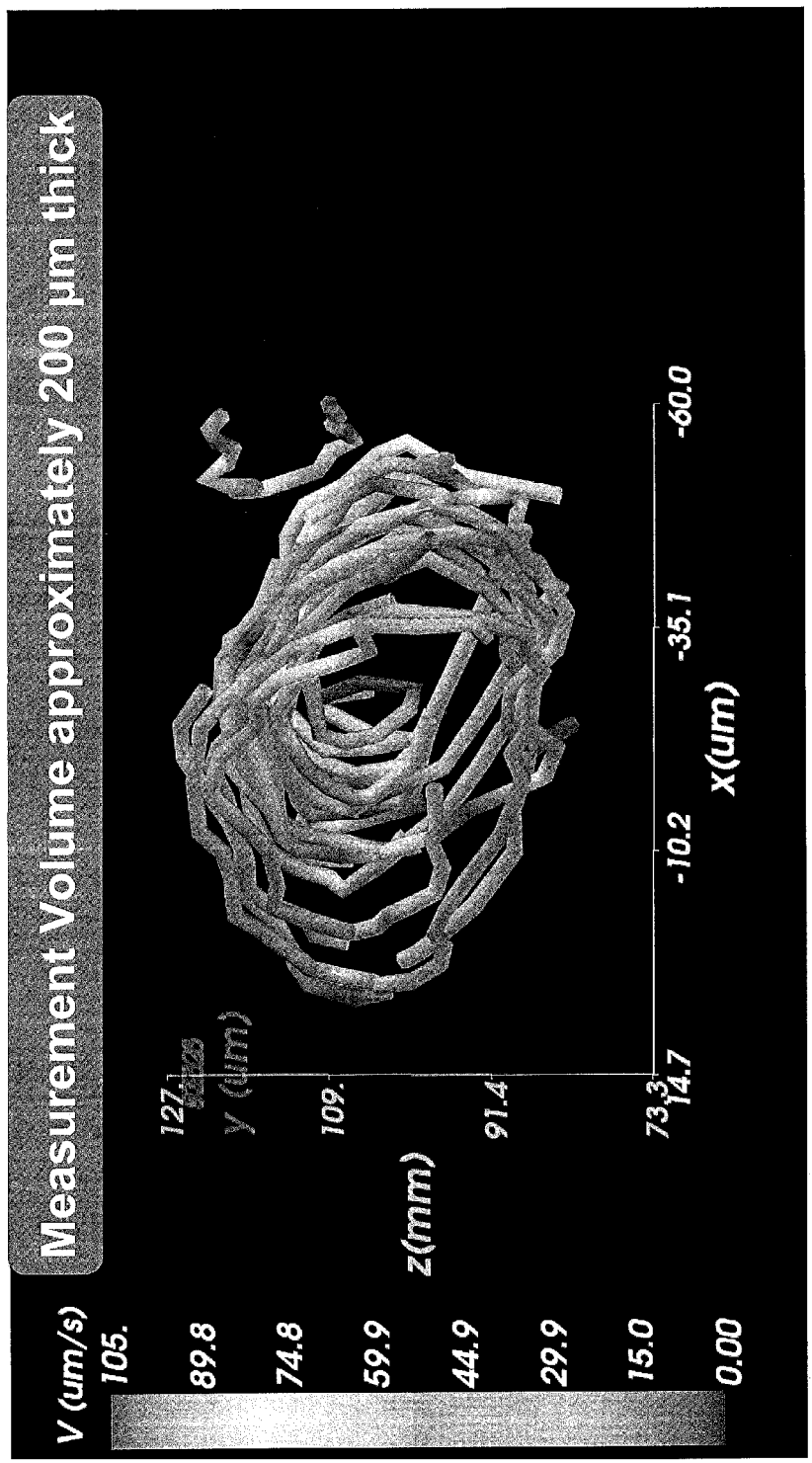
FIG. 6 is an image of a depiction of 3D tracking as may be produced by the system of FIG. 5.

FIG. 5 illustrates a microscopy-based 3D tracking system 200, having similar elements to the system 100, and thus bearing similarly numbered reference numerals. For the system 200, a 3D tracking processor 201 the provides image processing and additionally performs tracking of the particle locator of storage on a memory (or database) 203 (which may be used in the other examples herein, such as systems 100 and 300) and displayed on a display 205, of which FIG. 6 illustrates an example display.

The system 200 may perform 3D tracking using (what is termed herein) Bessel beam particle tracking velocimetery (BB-PTV). With BB-PTV, the system 200 is capable of determining the depth of the particle in a fundamentally different way than conventional measurement techniques. Whereas most 3D particle locating techniques rely on correlating some form of deformation of the particle image to the particle's distance from the focal plane, the 3D tracking processor 201 may measure the direction and curvature of a wavefront produced by a particle. The curvature of that wavefront can then be directly related to the position of the particle using Fresnel diffraction theory and paraxial optics, which may be tracked continually during particle movement.

The techniques are able to measure the curvature and direction of the wavefront by placing the axicon 214 between the camera 210 and imaging optics 212. The imaging optics may be chosen such that a particle on the optical axis and in the focal plane produces a plane wave. As discussed, when the particle wavefront passes through the axicon 214, it is transformed into the Bessel beam (interference beam) which then travels free of diffraction to the camera 210. Notably for 3D tracking, small changes in the position of the particle will produce corresponding changes in the curvature and direction of the wavefront leaving the imaging optics. Changes in curvature and direction will modify the frequency and location of the Bessel beam as seen by the camera. These changes can then be automatically correlated to the position of the particle using a simple algebraic relation.

For example, a BB-PTV was used to measure the complex 3D flow of an electrothermal vortex. The electrothermal vortex is a microfluidic phenomenon that occurs when an alternating voltage is applied to two parallel electrodes that are separated by a water filled gap and a temperature gradient is applied to the fluid. The result is a vortex which carries along particles in a toroidal path. One such particle was tracked in an electrothermal vortex formed in a 50 μm gap using a 3.5 V peak to peak AC voltage driven at 10 kHz. FIG. 6 illustrates part of the path of this particle as well as the magnitude of its velocity. A 1° axicon was used for these experiments with a 40× lens. The resulting measurement volume was about 150 μm thick, or three times greater than the thickness of the flow field measured. The particle track was still recorded with a velocity in the region of 50 μm/s.

This measurement technique offers several advantages over conventional techniques. The BB-PTV relies on fluorescent particles small enough to be considered point sources of light. The maximum size of a particle is a function of the imaging optics, but for an objective with a magnification of 20×, particles smaller than 3 μm are ideal. Additionally, BBM techniques can be tailored so that its dynamic measurement range matches the needs of an experiment by adjusting the optics used. Finally, techniques may be implemented without need for calibration.

The present techniques may be used in other applications, as will be apparent upon reading this disclosure, including determining the structure of fluorescently tagged cell components, measuring the motion and dynamics of fluorescently tagged cell proteins or components, and tracking of chemical reactions among others.

Figure 7:
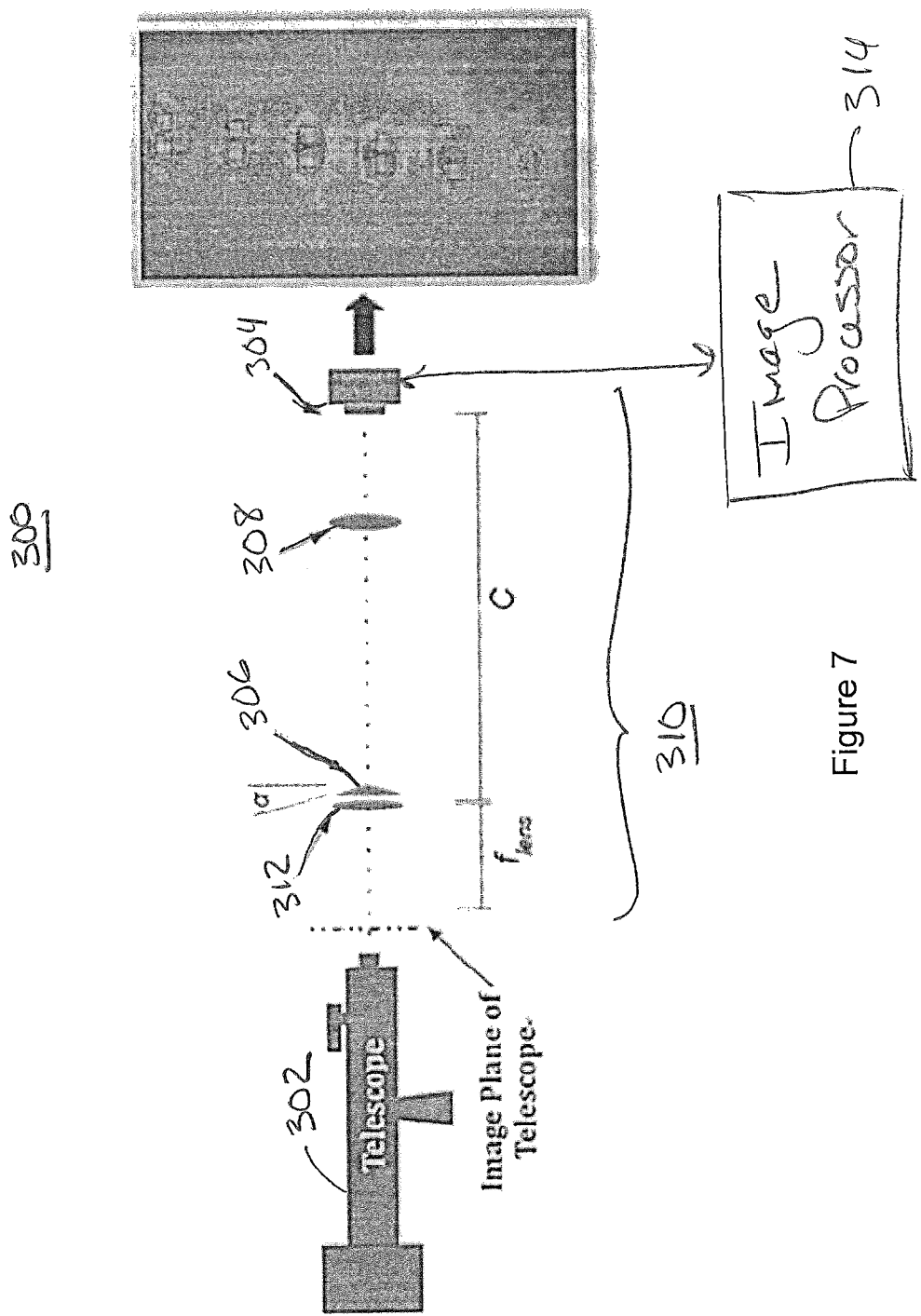
FIG. 7 is a schematic of an enhanced resolution telescope system, in accordance with an example.

The present techniques may also be used to form a practical single-acquisition super-resolution telescope. FIG. 7 illustrates an example enhanced resolution telescope system 300. A Bessel beam interference pattern is created for each point of light imaged by a telescope 302. These Bessel beams propagate to a camera 304 located a distance from an axicon 306 limited by the distance over which the Bessel beam maintains its integrity. Additional "modifying" optics 308 may be placed between the axicon 306 and camera 304 to modify the imaging properties of the system. These optics 308 may increase or decrease the width of the PSF as well as change the apparent distance between the axicon 306 and camera sensor 304. Provided the optical elements and illumination within this space remain paraxial it is possible to succinctly describe this space using a ray transfer matrix. One can derive an expression for the width of the Bessel beam central peak as imaged by the camera 304 using a formulation of the Fresnel diffraction integral that allows for propagating an electric field between two planes where the space between can be described using a ray transfer matrix. If we take Equation 2 and express it in the diameter, $d_a$, of the telescope (302) aperture, $C_{max}$, becomes:

$$C_{max} = \frac{d_a D}{2\alpha(n_{ax} - 1)} \qquad \text{Equation 10}$$

where $n_{ax}$ is the index of refraction of the optical elements between the axicon 306 and the camera 304. Resolving Equations 2 and 10, one an expression for the diffraction limited angular resolution of an axicon enhancement stage 310 of the telescope 300:

$$\theta_{min} = 0.76 \frac{\lambda}{d_a C'} \qquad \text{Equation 11}$$

where C' is C normalized by its maximum possible value.

Equation 11 is similar in form to the Rayleigh criterion diffraction limited resolution of a traditional telescope ($O_{min}=1.22\lambda/d_a$), but 38% smaller when C' is at its maximum value, which is an enhancement improvement in line with that of a microscope described above.

In addition to the increase in spatial resolution, one can control the relative brightness, or Strehl ratio, of the resulting images from the telescope system 300, by lowering the surface angle of the axicon, α, and D by equal amounts. Adjusting these values can leave the PSF width the same, but increase the brightness of the images without changing the angular resolution.

In an example implementation of FIG. 7, the telescope 302 was a refracting telescope with a focal length of 750 mm. The axicon enhancement system 310 includes a lens pair forming an objective lens stage 312. The lens pair included a −150 mm lens and a 100 mm lens arranged with a combined focal length of 165 mm and located their combined focal length from the focal plane of the telescope. Immediately following the lens pair 312, the axicon enhancement system 310 includes the axicon 306 with a surface angle, α, of 1°. The Bessel beam produced by the axicon 306 was allowed to freely propagate for 205 mm before passing through an additional optical stage 308, which was a 100 mm lens, located 48 mm from the camera (304) imaging surface. This modifying lens configuration produced a system matrix values of C=155 mm, or C'=0.93 and D=0.52. Images were acquired with a pco 1600 camera with 7.6 μm square pixels. Finally, the aperture of the telescope was reduced to 3 cm to degrade the diffraction limit such that its effects are visible with the camera. The camera 304 was connected to an image processor 314, which though shown separate could be part of the camera or imaging device, in other examples.

In this example implementation, the system 300 was used to image a transparency printed with a series of dot pairs of various separations ranging from 1.0 mm (a.) to 0.5 mm (f.) in 0.1 mm increments. These series of clear dots (100 μm in diameter) were "printed" on a black background to produce point sources of light at various angular spacing centered around the diffraction limited angular resolution of the base telescope 302 (5.3 arcseconds at 633 nm) when viewed at a distance of 23 m. The transparency is back illuminated with a halogen lamp filtered to allow only red light centered on a wavelength of 633 nm.

Figures 8A, 8B:
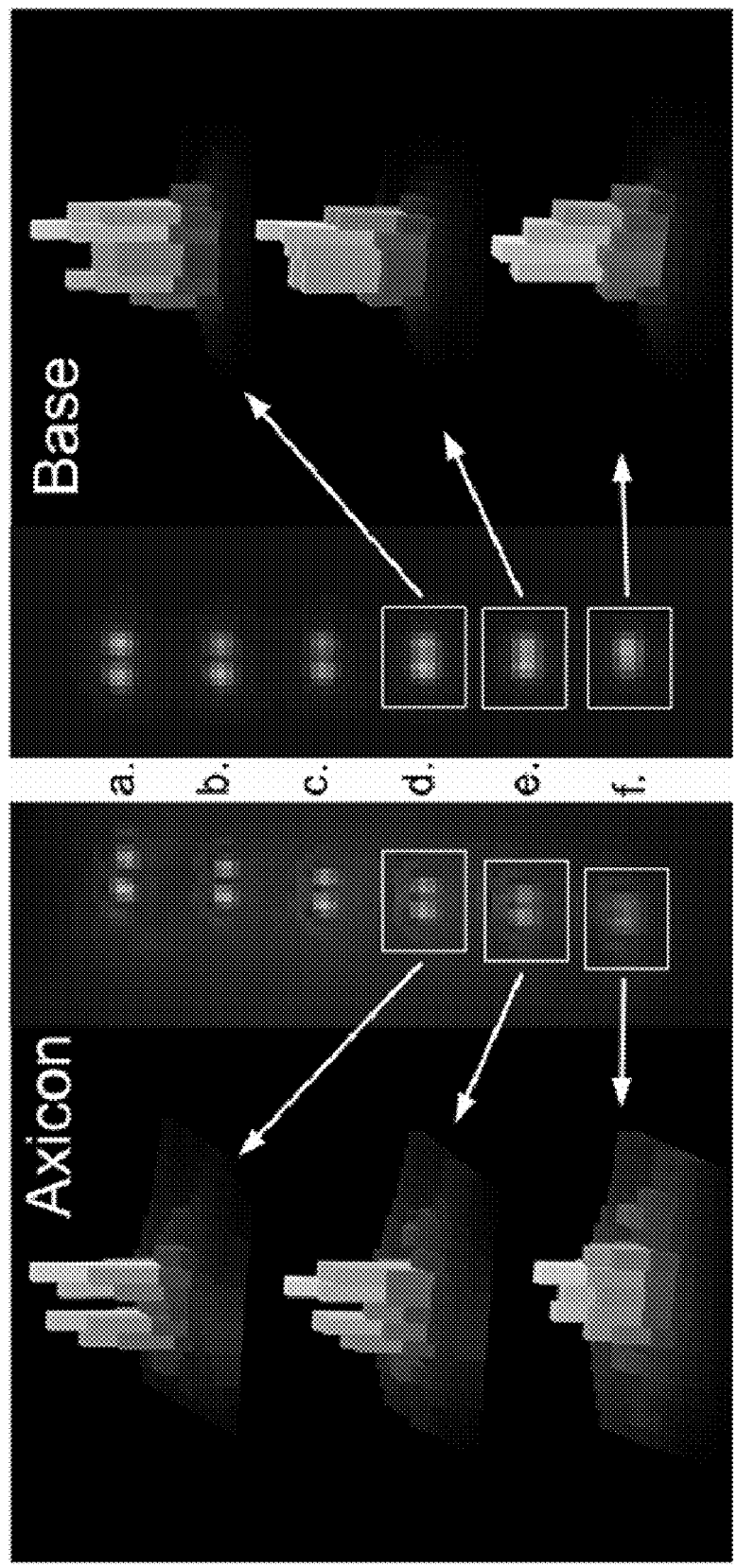
FIGS. 8(a) and 8(b) illustrate results of imaging point spread functions over multiple rows, using the telescope system of FIG. 7, with FIG. 8(a) showing imaging with an axicon enhancement system and with FIG. 8(b) showing imaging of the base telescope without an axicon enhancement system, in accordance with an example.

FIGS. 8(a) and 8(b) shows the results of imaging this transparency both with (FIG. 8(a)) and without (FIG. 8(b)) the axicon enhancement system 310. For these images the axicon system has an angular magnification that is 0.93 times smaller than that of the base telescope causing the points to appear slightly closer together. The images of the point source pairs shown in the center, each row labeled as described earlier according to point spacing. Rows d, e, and f are shown as a three dimensional surface plot where the height and color are proportional to the intensity of each pixel. These images show a clear increase in contrast and separation of the two point sources. In FIGS. 8(a) and 8(b), the base telescope images of hole pair d have an average peak to valley dip of 24%, close to the difference predicted when using the Rayleigh limit. At this same distance the axicon enhanced system has a peak to valley dip of 73%, effectively completely separating the central peaks as the valley intensity is composed completely of energy from the side-lobes of the axicon PSF. At hole pair e, the PSFs have completely merged for the base telescope. However, for the axicon enhanced system the two points have an average peak to valley dip of 11%, still discernible by eye. The results shown in the example of FIGS. 8(a) and 8(b) are remarkable for a number of reasons, including the manner in which they were achieved: the resolution enhancing optics were added after the imaging optics of the system. Compared to a base telescope, the axicon enhanced system has much higher energy at higher spatial frequencies, including those extending beyond the apparent range of the base system. The presence of higher energy at high spatial frequencies indicates that the axicon enhanced system more effectively utilizes this information.

FIGS. 9(a) and 9(b) illustrates two PSFs in another example illustrating enhancements achievable with the present system. FIG. 9(a) illustrates single 300 μm hole using a telescope with an axicon enhancement system; and FIG. 9(b) illustrates the same hole imaged using the base telescope without the axicon enhancement system. The increase in resolution, including the contrast increase and the reduction in the number of pixels (6 to 4) over which the peak contrast may be discerned, is considerable. Even further increases in Strehl ratio are possible, for example, if axicons with ultra-low surface angles are used and by choosing appropriate modifying optics.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

Thus, although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An imaging apparatus, the apparatus comprising:
   an image capture stage to collect image data of an object and to produce first image data of the object;
   an interference-based resolution enhancement stage coupled to receive the first image data from the image capture stage, wherein the interference-based enhancement stage comprises an objective lens stage and an axicon stage, wherein the objective lens stage and the axicon stage are positioned to produce a Bessel-beam based interference image from the first image data, wherein the resolution of the Bessel-beam based interference image is improved over that of the first image data and beyond the diffraction limit of the image capture stage to form a super resolution image; and
   an image processor configured to apply a de-convolving process to de-convolve the Bessel-beam based interference image with a Bessel beam image.

2. The imaging apparatus of claim 1, wherein the resolution of the Bessel-beam based interference image is 38% improved over the resolution of the first image data.

3. The imaging apparatus of claim 1, wherein the resolution of the Bessel-beam based interference image is improved over the entire Bessel-beam based interference image.

4. The imaging apparatus of claim 1, wherein objective lens stage comprises a convex lens.

5. The image apparatus of claim 4, wherein the convex lens is positioned at a focal plane of the image capture stage.

6. The imaging apparatus of claim 1, further comprising an optical mask positioned relative to the axicon to block a portion of the interference image thereby further enhancing the resolution of the resulting affected interference image.

7. The imaging apparatus of claim 1, wherein the image capture stage is a microscope.

8. The imaging apparatus of claim 1, wherein the image capture stage is a telescope.

9. The imaging apparatus of claim 1, further comprising an imaging device positioned to capture the interference image produced by the objective lens stage and the axicon stage.

10. The imaging apparatus of claim 9, wherein the image processor is coupled to the imaging device and configured to determine a location of the sample from image data received from the imaging device.

11. The imaging apparatus of claim 10, wherein the image processor is configured to determine the location of the sample by determining a peak position of at least one interference pattern within the image data received from the imaging device.

12. The imaging apparatus of claim 11, wherein the image processor is configured to determine a Bessel frequency of the at least one interference pattern.

13. The imaging apparatus of claim 10, wherein the image processor is configured to identify one or more analysis windows of the image data received from the imaging device (i) perform a normalized cross-correlation on the one or more analysis windows, (ii) identify a peak from the normalized cross-correlation, and (iii) determine a maximum cross-correlation peak from the normalized cross-correlation.

14. The imaging apparatus of claim 10, wherein the image processor is a 3D tracking imaging processor.

15. The imaging apparatus of claim 9, wherein the imaging device is a camera.

16. A method of imaging, the method comprising:
collecting first image data of an object;
providing the first image data to an interference-based resolution enhancement stage, the interference-based resolution enhancement stage having an objective lens stage and an axicon stage;
producing, by the interference-based resolution enhancement stage, a Bessel-beam based interference image from the first image, wherein the resolution of the Bessel-beam based interference image is improved over that of the first image data and beyond the diffraction limit of the image capture stage to form a super resolution image; and
de-convolving the interference image with a Bessel beam image to produce an enhanced version of the interference image.

17. The method of claim 16, wherein the resolution of the Bessel-beam based interference image is 38% improved over the resolution of the first image data.

18. The method of claim 16, wherein the resolution of the Bessel-beam based interference image is improved over the entire Bessel-beam based interference image.

19. The method of claim 16, wherein objective lens stage comprises a convex lens.

20. The method of claim 19, wherein the convex lens is positioned at a focal plane of the image capture stage.

21. The method of claim 16, further comprising blocking a portion of the interference image to produce an enhanced version of the interference image.

22. The method of claim 16, further comprising:
imaging the interference image to an imaging device; and
determining, in an image processor, a location of the object from image data received from the imaging device.

23. The method of claim 22, wherein determining the location of the object from image data received from the imaging device comprises:
determining a peak position of at least one interference pattern within the image data received from the imaging device; and
determining a Bessel frequency of the at least one interference pattern.

24. The method of claim 16, further comprising:
imaging the interference image to an imaging device;
identifying, in an image processor, one or more analysis windows of the image data;
performing, in the image processor, a normalized cross-correlation on the one or more analysis windows;
identifying, in the image processor, a peak from the normalized cross-correlation; and
determining, in the image processor, a maximum cross-correlation peak from the normalized cross-correlation.

* * * * *

UNITED STATES PATENT AND TRADEMARK OFFICE
CERTIFICATE OF CORRECTION

PATENT NO. : 9,494,785 B2  
APPLICATION NO. : 14/101107  
DATED : November 15, 2016  
INVENTOR(S) : Steven T. Wereley et al.

Page 1 of 1

It is certified that error appears in the above-identified patent and that said Letters Patent is hereby corrected as shown below:

In the Claims

At Column 12, Line 42, "image" should be -- imaging --.

Signed and Sealed this  
Ninth Day of May, 2017

Michelle K. Lee  
*Director of the United States Patent and Trademark Office*